United States Patent
Flath

(10) Patent No.: US 8,537,006 B2
(45) Date of Patent: Sep. 17, 2013

(54) DATA STORAGE DEVICE AND METHOD

(76) Inventor: Laurence Flath, Moss Beach, CA (US)

( * ) Notice: Subject to any disclaimer, the term of this patent is extended or adjusted under 35 U.S.C. 154(b) by 373 days.

(21) Appl. No.: 12/940,018

(22) Filed: Nov. 4, 2010

(65) Prior Publication Data

US 2012/0112907 A1    May 10, 2012

(51) Int. Cl.
*G08B 21/00*    (2006.01)

(52) U.S. Cl.
USPC ........... 340/540; 340/539.26; 340/539.28; 340/601; 340/699; 365/52; 711/154

(58) Field of Classification Search
USPC ............ 340/540, 539.1, 539.19, 539.26, 340/539.28, 546, 601, 669; 345/211; 365/52; 369/47.5, 47.55; 711/114, 154
See application file for complete search history.

(56) References Cited

U.S. PATENT DOCUMENTS

| | | | |
|---|---|---|---|
| 7,990,823 B2 * | 8/2011 | Tanaka et al. | 369/47.55 |
| 2010/0275050 A1 * | 10/2010 | Hong | 713/324 |

OTHER PUBLICATIONS

Z Microsystems, Inc.; Tranzstor MTRS (Multi-Terabyte Raid Subsystem); accessed on Jul. 15, 2010.

* cited by examiner

*Primary Examiner* — Hung T. Nguyen
(74) *Attorney, Agent, or Firm* — Steven M. Greenberg, Esq.; Carey Rodriguez Greenberg O'Keefe, LLP

(57) ABSTRACT

A portable, high-capacity data storage device for storage, transport, and retrieval of multi-terabyte-level data sets comprises a plurality of individual main data storage units coupled to a data bus and a controller isolated from the data bus. The data storage device can be coupled to an external system to establish data access connections between the external system and the individual main data storage units via a first communication path comprising the data bus, with the controller and external system communicating with one another via a second communication path logically isolated from the first communication path. The data storage device can be provided with sensors that enable the controller to monitor the surrounding environment, and can be provided with a non-volatile display.

18 Claims, 8 Drawing Sheets

DATA STORAGE DEVICE AND METHOD

FIELD OF INVENTION

The present invention relates to data storage devices, and more particularly to high capacity data storage devices comprising a plurality of individual data storage units.

BACKGROUND OF THE INVENTION

Certain applications, such as detailed airborne surveillance operations, and medical and engineering imaging applications, generate massive data sets. For example, mere hours of high-resolution sensor input can accumulate data in the petabyte (1000 terabyte) range, which must be stored for later analysis. There exists a need to provide for effective storage, transportation and retrieval of such massive data sets.

SUMMARY OF THE INVENTION

The present invention provides a portable, high-capacity device for storage, transport, and retrieval of data sets in the multi-terabyte range.

In one aspect, the present invention is directed to a data storage device for use in cooperation with a data processing system external to the data storage device. The data storage device comprises a housing, a plurality of discrete individual non-volatile main data storage units, a data bus coupled to each of the main data storage units to transmit data to and receive data from the main data storage units, a power bus coupled to each of the main data storage units, and a controller coupled to the power bus. The main data storage units, the data bus, the power bus and the controller are each carried by the housing. The power bus has, for each main data storage unit, at least one switch associated with that main data storage unit and operable to selectively permit or interrupt current flow to that main data storage unit, and the controller is operable to selectively open and close the switches. The controller is isolated from the data bus and is also isolated from the main data storage units. A data communication port is coupled to the data bus to enable external communication to and from the main data storage units, and a controller communication port is coupled to the controller to enable external communication to and from the controller. The data communication port and the controller communication port are distinct from and isolated from one another. A power port is coupled to the power bus for connection to an external power source. The data communication port, controller communication port and power port are carried by the housing.

In one embodiment, the controller comprises at least one processor, and the at least one processor communicates with a processor storage that is carried by the housing and is distinct from the main data storage units. Such an embodiment may further comprise a display carried by the housing. The display has a display surface visible from outside the housing, and is coupled to the power bus to receive power therefrom and is also coupled to the at least one processor to display information in accordance with instructions from the at least one processor. Preferably, the display is a persistent display that continues to display its most recent image after discontinuance of electrical power supply to the display.

The data storage device may further comprise at least one environmental sensor carried by the housing and coupled to the power bus and to the at least one processor. In such an embodiment, the at least one processor is configured to initiate an action in response to signaling from the at least one environmental sensor indicating that an environmental threshold is exceeded. The at least one environmental sensor may include, for example, an accelerometer, one or more temperature sensors, and one or more barometric pressure sensors.

In a particular embodiment, the main data storage units, the controller, the processor storage, the data bus and the power bus are contained within a pressurized environment in a pressurized part of the housing. This embodiment may include at least one internal temperature sensor located inside the pressurized part of the housing and at least one external temperature sensor located outside the pressurized part of the housing, and may also or alternatively include at least one internal barometric pressure sensor located inside the pressurized part of the housing and at least one external barometric pressure sensor located outside the pressurized part of the housing. The at least one processor is configured to compare signals from the internal and external temperature and/or barometric sensors, respectively, to determine whether a temperature differential threshold or a barometric pressure threshold, respectively, has been exceeded and, responsive to a determination that a temperature differential threshold or barometric pressure differential has been exceeded, to initiate an appropriate action, such as activating an alarm or shutting down the main data storage units.

In one embodiment, the housing includes a handle.

In another aspect, the present invention is directed to a data storage device. The data storage device comprises a housing, a plurality of discrete individual non-volatile main data storage units, a data bus coupled to each of the main data storage units to transmit data to and receive data from the main data storage units, a power bus coupled to each of the main data storage units, and a controller coupled to the power bus. A data communication port is coupled to the data bus to enable external communication to and from the main data storage units, and a power port is coupled to the power bus for connection to an external power source. The main data storage units, the data bus, the power bus, the data communication port and the power port are each carried by the housing. The data storage device further comprises a configuration storage element, which is also carried by the housing and is coupled to the power bus to receive power therefrom. The configuration storage element is distinct from and isolated from the main data storage units, and contains configuration information reflecting the configuration of the main data storage elements. A configuration communication port, also carried by the housing, is coupled to the configuration storage element to enable external communication to and from the configuration storage element. The data communication port and the configuration communication port are distinct from and isolated from one another.

In one embodiment, the configuration storage element is coupled to the configuration communication port via a processor coupled to the configuration storage element and to the configuration communication port. The configuration storage element may contain state information about at least one state of the main data storage units. Such state information may include information about data stored on the main data storage units.

The data storage device may further comprise at least one environmental sensor carried by the housing and coupled to the power bus and to the configuration storage element, and in this embodiment the state information includes information derived from input from the at least one environmental sensor.

In a further aspect, the present invention is directed to a method for operating a data bus connection between a data processing system and a data storage device external to the data processing system. The method comprises a step of receiving, at the data processing system, configuration information from a controller of the data storage device via a first communication pathway. The received configuration information reflects the configuration of a plurality of discrete individual non-volatile main data storage units forming part of the data storage device. The method includes as a later step the data processing system using the configuration information to communicate with at least one of the main data storage units of the data storage device via a second communication pathway that is isolated from the first communication pathway.

The method may also include monitoring at least one environmental condition of an environment in which the data storage device is located, and initiating an appropriate action, such as activating an alarm or shutting down the main data storage units, when an environmental threshold is exceeded. The environmental conditions monitored may include, for example, acceleration, temperature, and barometric pressure.

The method may further comprise displaying at least a portion of the configuration information.

BRIEF DESCRIPTION OF THE DRAWINGS

These and other features of the invention will become more apparent from the following description in which reference is made to the appended drawings wherein.

DETAILED DESCRIPTION

Figure 4:
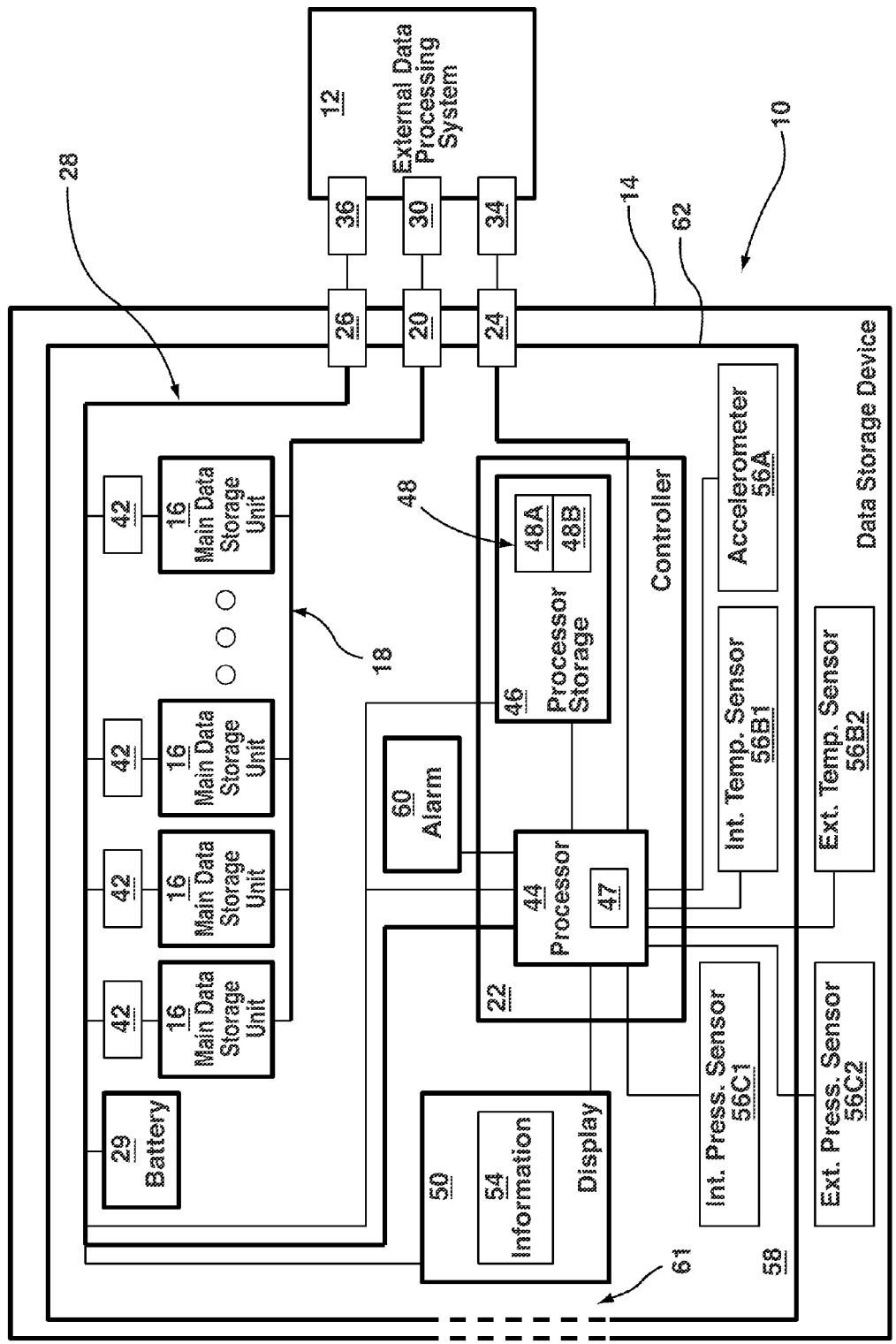
FIG. 4 is a schematic representation of a data storage device according to an aspect of the present invention, coupled to an external data processing system.

Reference is first made to FIG. 4, which is a simplified schematic illustration of an exemplary data storage device 10 according to an aspect of the present invention. The data storage device 10 is intended for use in cooperation with a data processing system external to the data storage device 10. In the illustrated embodiment, the data storage device 10 is shown removably coupled to an external data processing system 12. Internal schematic details of the external data processing system 12 are omitted, these being within the capability of one skilled in the art, now informed by the herein disclosure.

The data storage device 10 comprises a housing 14, a plurality of discrete individual non-volatile main data storage units 16, a data bus 18, a data communication port 20, a controller 22, a controller communication port 24, a power port 26 and a power bus 28. The main data storage units 16, data bus 18, data communication port 20, controller 22, controller communication port 24, power port 26 and power bus 28 are each carried by the housing 14. When the data storage device 10 is coupled to the external data processing system 12, as shown in FIG. 4, the data communication port 20, controller communication port 24 and power port 26 are coupled to respective corresponding external ports 30, 34 and 36 on the external data processing system 12. The external controller communication port 34 will typically connect the controller 22 to the external data processing system 12 via a network-mediated connection, such as an Ethernet switch coupled to the external data processing system 12, although a direct hardware connection is also contemplated, for example a USB connection.

The main data storage units 16 may be, for example, magnetic hard drives, which at the time of filing provide the highest bit density per dollar of any random access storage medium. Accordingly, in the illustrated embodiment the main data storage units 16 are sixteen 2.5 inch magnetic hard drives with Serial Advanced Technology Attachment (SATA) 3.0 interfaces which may be coupled directly to standard SATA connectors, which provides flexibility for determining the type and logical configuration of the main data storage units 16. For example, each of the 16 main data storage units 16 could be routed individually to sixteen separate SATA controllers; this is usually referred to as a "Just a Bunch of Disks" (JBoD) configuration, or a Redundant Array of Independent Disks (RAID) configuration may be used. In a RAID configuration, all of the main data storage units 16 may be driven by the same SATA controller in either a striped (RAID0), mirrored (RAID1), or parity (RAID5/6) configuration. It should be noted here that the "SATA controller" referred to herein is a controller forming part of external data processing system 12 and which is used to distribute data across multiple individual data storage units; it is not the same element as the controller 22, which is used to perform functions other than distributing data across multiple individual data storage units. The main data storage units 16 may also be logically divided into two RAID volumes. In a first implementation of such an arrangement, each volume is an individually accessed RAID set, and in a second implementation data is striped between the two RAID sets to provide both speed and redundancy. The sixteen main data storage units 16 may also be logically arranged as eight individual RAID1 sets. A variety of additional and more sophisticated RAID configurations are also contemplated. For example, and without limitation, the sixteen main data storage units 16 may be logically arranged as a single RAID1 mirror of two main data storage units 16, and a RAID5 set of twelve main data storage units 16 with two hot spares and one unused drive. This is a very specific example of one particular configuration, and many other configurations may be used without departing from the scope of the present invention. Suitable configurations of the main data storage units 16 will depend on the application, and the selection of a suitable configuration will be within the capability of one skilled in the art, now informed by the herein disclosure. While the illustrated embodiment of the data storage device 10 described herein includes sixteen main data storage units 16, data storage devices according to aspects of the present invention may include more or fewer main data storage units.

Although depicted in the illustrated embodiment as being magnetic hard drives, the main data storage units 16 may also be solid state drives (SSDs), and may also comprise other suitable types of storage that may be hereafter developed. The multi-terabyte data storage capacities for the present invention are based on current (that is, current as of the filing date) capacities of the main data storage units 16, such as magnetic hard disks or solid state drives. It is expressly contemplated that improvements in the storage capacities of these data storage units will increase the storage capacity of data storage devices constructed according to aspects of the present invention. It is also expressly contemplated that new types of data storage units may be subsequently developed, and that such new types of data storage units may, when suitable, be used as main data storage units in data storage devices constructed according to aspects of the present invention.

As between magnetic hard drives and solid state drives, the choice of what type of main data storage units 16 to use within the data storage device 10 depends on a number factors. At the time of filing, magnetic hard drives have higher capacity and a lower cost per gigabyte (GB) of storage than do solid state drives, but solid state drives have lower power consumption, higher I/O throughput, lower I/O latency and higher resistance to shock than do magnetic hard drives.

The data communication port 20 is coupled to the data bus 18, which is in turn coupled to each of the main data storage units 16. The data bus 18 can transmit data to, and receive data from, each of the main data storage units 16, and the data communication port 20 can transmit data to, and receive data from, both the data bus 18 and the external data port 30 on the external data processing system 12. Thus, the data bus 18 and data communication port 20 cooperate to enable external communication to and from the main data storage units 16, that is, communication between the main data storage units 16 and the external data processing system 12 when the data storage device 10 is connected thereto.

The power port 26 is connectable to an external power source, which in the embodiment shown in FIG. 4 is the external power port 36 on the external data processing system 12, and is also coupled to the power bus 28. The power bus 28 is in turn carried by the housing 14 (for example, it may be part of the printed circuit board 106 shown in FIG. 3) and is coupled to power terminals (not specifically shown) of each of the main data storage units 16 to provide power thereto. Optionally, the power bus 28 is coupled to a backup battery 29 which can recharge from the power bus 28 when the power port 26 is connected to an external power source, and can provide backup power to the power bus 28 when the power port 26 is not connected to an external power source or in the event of a failure of that power source.

The power bus 28 includes a plurality of switches 42, with one switch 42 being associated with each main data storage unit 16. Although in the illustrated embodiment only a single switch 42 is associated with each main data storage unit 16, in other embodiments more than one switch 42 may be associated with each main data storage unit 16. Each of the switches 42 is operable to selectively permit or interrupt current flow to its respective main data storage unit 16, and the controller 22 is coupled to the power bus 28 both to receive power therefrom and also to selectively open and close the switches 42. The controller 22 is coupled to the controller communication port 24, thereby enabling external communication to and from the controller 22. For example, in the embodiment illustrated in FIG. 4 the controller 22 can communicate, via the controller communication port 24, with the external controller port 34 on the external data processing system 12 to receive instructions therefrom, and can open and close the switches 42 in response to those instructions so as to selectively power up or power down individual main data storage units 16.

As can be seen in FIG. 4, the controller 22 is logically isolated from the data bus 18 and is also logically isolated from the main data storage units 16. In other words, the controller 22 cannot communicate directly with the main data storage units 16. Similarly, the data communication port 20 and the controller communication port 24 are two different ports that are distinct from and logically isolated from one another.

Storage support for extremely large data sets is limited by the hardware that accesses the main data storage units 16 (e.g. the SATA controller where the main data storage units 16 are SATA magnetic hard drives) as well as the operating system and the file system support of the external data processing system 12.

Generally, most hardware, operating systems and file systems operate with overall storage sizes below two terabytes (TB), while the aggregate storage capacity of a data storage device according to aspects of the present invention can significantly exceed this value. Also, hardware RAID controllers (again, these are distinct from the controller 22 for the data storage device 10) may place proprietary formatting information on the main data storage units 16. According to an aspect of the present invention, electrical activation and deactivation of the main data storage units 16 is under individual control of the controller 22 via the switches 42, allowing the external data processing system 12 to query the data storage device 10, via the controller 22, to see if the recorded format is compatible with the storage hardware, operating systems and file system capabilities of the external data processing system 12 before activating the main data storage units 16 via the controller 22 and switches 42. This procedure may be beneficial to avoid operating system instabilities and/or data corruption which may result from attempting to mount an incompatible disk format/organization.

In the embodiment shown in FIG. 4, the controller 22 comprises at least one processor 44 which communicates with a processor storage 46 also carried by the housing 14. Although only a single controller 22 is shown in FIG. 4, the controller 22 may in practice comprise a plurality of processors 44. The processor storage 46 may be, for example, flash storage. As will be explained below, the processor storage 46 can store user information, such as disk organization/usage, corporate images, data logs, and the like, as well as system information, and may also store instructions for execution by the processor 44. In the illustrated embodiment, the controller 22 is a single unit comprising the processor 44 as well as the onboard processor storage 46; in other embodiments the processor storage may be a separate element. In either case, however, the processor storage 46 is distinct from and logically isolated from the main data storage units 16, as can be seen in FIG. 4. The processor storage 46 receives power from the power bus 28, either directly as illustrated or via the processor 44.

The processor 44 controls the subsystems of the data storage device 10 and monitors the environmental sensors 56 (explained in greater detail below). For example, the processor 44 can monitor the power port 26 through the power bus 28 to determine whether the power port 26 is connected to an external power source, in which case the processor 44 directs the backup battery 29 to charge (or maintain its charge) from the power bus 28. If the processor 44 detects an unexpected disconnect of the power port 26 from the external power source, such as removal of the data storage device 10 without proper shutdown or a power failure affecting the external power source, the processor 44 can direct the backup battery 29 to provide power to the power bus 28 for emergency operations. Alternatively, the backup battery 29 may be configured to automatically charge when the power bus 28 is receiving power from an external source, and automatically provide power to the power bus 28 when it is not receiving power from an external source. Alternatively, a suitable capacitor may be used in place of the backup battery 29 to provide emergency power for a short duration.

In a preferred embodiment, the processor communication port 24 includes an Ethernet connection, allowing a user to remotely access the processor 44. Preferably, the processor 44 is able to execute instructions to operate as a web server and automatically discover an IP address and communicate via either the HyperText Transfer Protocol (HTTP) or the Simple Network Management Protocol (SNMP). This allows for direct monitoring and control of the data storage device 10 via a standard web browser. SNMP allows for non-graphical operation either via a command-line-interface (CLI) in a remote terminal, or directly using code (system-type command). The instructions to operate as a web server may be embedded in the processor 44, for example as firmware, or may be stored on the processor storage 46.

As noted above, the controller 22, and hence the processor 44 in the illustrated embodiment, is coupled to the power bus 28 to selectively open and close the switches 42. Many operating systems do not have support for disk volumes with capacities in the multi-terabyte range, which are enabled by data storage devices according to aspects of the present invention. The processor 44 can execute instructions to automatically notify an external data processing system (e.g. the external data processing system 12) when the data storage device 10 is coupled thereto. In addition, all of the necessary parameters for the external data processing system to connect to the data storage device 10, such as drive configuration, disk format, data summary information, and the like, can be stored in the processor storage 46. The processor 44 can either automatically spin-up the main data storage units 16 (where they are magnetic hard drives), or wait for a command from the external data processing system 12 to do so. The main data storage units 16 may be turned on simultaneously or in sequence to reduce inrush currents.

The processor 44 is also coupled to, and controls, a display 50, so as to provide realtime feedback to the user as to the state of the data storage device 10, and can also receive user input, allowing the user to change the type of information displayed and set particular system parameters. The display 50 is described further below. The processor 44 also includes a battery-backed real-time clock (RTC) 47. The real-time clock 47 allows for automatic time-stamping of various data, such as sensor logs, file/disk names, and the like. Where the processor 44 is Internet-capable, as indicated above, it can automatically keep the real-time clock 47 current via the network time protocol (NTP).

In the illustrated embodiment, the processor storage 46 functions as a configuration storage element that contains configuration information reflecting a configuration of the main data storage elements 16, and the controller communication port 24, which is coupled to the processor storage 46 through the processor 44, functions as a configuration communication port which, as noted above, is distinct from and logically isolated from the data communication port 20. The processor storage 46 contains state information 48 about at least one state of the main data storage units 16. The state information 48 may include, for example, information 48A about data stored on the main data storage units 16, information 48B derived from input from environmental sensors associated with the data storage unit 10, and/or additional information. The state information 48 may be communicated to the external data processing system 12 via the controller communication port 24, and may also be used by the processor 26 to selectively power up or power down the main data storage units 16 in response to specific states thereof.

The data storage device 10 illustrated in FIG. 4 further comprises a display 50 carried by the housing 14. The display 50 has a display surface 52 (see FIGS. 1 to 3) visible from outside the housing 14, and is coupled to the power bus 28 to receive electrical power therefrom and to the processor 44 to display information 54 in accordance with instructions from the processor 44. The information 54 may include, for example, operational information such as I/O throughput, capacity metering, and subsystem/sensor status. The information 54 displayed by the display 50 may, for example, represent or be derived from the state information 48. Preferably, the display surface 52 includes an integrated touch-sensitive screen via which a user can provide input to the processor 44; alternatively or additionally, buttons 142, 144 (see FIGS. 1 to 3) are provided at the edge of the display 50 for providing such input, for example to configure the data storage device 10.

In a preferred embodiment, the display 50 is a persistent, i.e. non-volatile, display that continues to display its most recent image after discontinuance of electrical power supply to the display. This allows the display 50 to serve as a label for the contents of the data storage device 10. In many applications, a user will typically have a plurality of data storage devices 10, and will require some means of differentiating between them; the display 50 can present information such as a volume identifier, stored session information, recording dates, and the like, even when the data storage device 10 has been disconnected from an external power source for several years. This avoids the use of tape and stickers as labels, as these can become separated from the data storage device 10 and are also unattractive. The information 54 may be automatically generated based on communication between the processor 44 and the external data processing system 12.

Because many display technologies are sensitive to temperature, the display 50 may be optionally fitted with a heater (not shown) when the intended operational environment includes colder conditions. Responsive to the internal temperature sensor(s) 56B1 and/or the external temperature sensor(s) 56B2 discussed below, the processor 44 can automatically activate the heater when the temperature falls below a value that results in lower than normal display refresh times.

In the illustrated embodiment, the data storage device 10 includes environmental sensors 56A, 56B1, 56B2, 56C1, 56C2 that are carried by the housing 14 and are coupled to the processor 44. The environmental sensors 56A, 56B1, 56B2, 56C1, 56C2 are coupled to the power bus 28, either indirectly via the processor as shown in FIG. 4, or directly. The processor 44 is coupled to an alarm system 60, which may be an audible alarm, a visual alarm, or a combination thereof. In alternative embodiments, the alarm system may be external to the data storage device 10, for example as part of the external data processing system 12. The processor 44 is configured to initiate an alarm in response to signaling from one or more of the environmental sensors 56A, 56B1, 56B2, 56C1, 56C2 indicating that an environmental threshold is exceeded. Where the alarm system 60 forms part of the data storage device 10, the processor 44 may trigger the alarm directly; where the alarm system is external to the data storage device 10, such as where the alarm system is part of the external data processing system 12, the processor 44 may send an alarm trigger signal through the controller communication port 24.

In addition, the sensor states may optionally be displayed on the display 50, and may also be made available to the external data processing system 12 via the controller communication port 12 using network protocols. Data from the environmental sensors 56A, 56B1, 56B2, 56C1, 56C2 may also be logged and stored in the processor storage 46.

In an embodiment preferred for high-altitude use, the main data storage units 16, the controller 22 (comprising the processor 44 and the processor storage 46), the data bus 18, the power bus 28 and preferably the display 50 are contained within a pressurized environment 58 within a pressurized part 62 of the housing 14, with the housing 14 and pressurized part 62 thereof including a transparent portion 61 to enable viewing of the display 50. In this exemplary embodiment, the environmental sensors 56 comprise an accelerometer 56A, at least two temperature sensors 56B1 and 56B2, and two barometric pressure sensors 56C1 and 56C2.

At least one internal temperature sensor 56B1 is located inside the pressurized part 62 of the housing 14. Preferably, several internal temperature sensors 56B1 are spread throughout the pressurized part 62 of the housing 14 and positioned to adequately sample temperature distribution within the pressurized part 62 of the housing 14, and the processor 44 can suitably process these inputs. At least one external temperature sensor 56B2 is located outside the pressurized part 62 of the housing 14, for example on the backplane of the housing 14 (see below), so that a comparison may be made between internal and external temperatures. The processor 44 is configured to initiate an action if signals from the internal temperature sensors 56B1 exceed a particular temperature threshold, and is also configured to compare signals from the internal and external temperature sensors 56B1, 56B2 to determine whether a temperature differential threshold has been exceeded, and to initiate an action if the temperature differential threshold has been exceeded. For example, a temperature threshold or temperature differential threshold may result from environmental factors, from a cooling system failure, or other causes. The action initiated by the processor 44 may be to activate the alarm system 60, to de-activate the main data storage units 16 (e.g. spinning them down in the case of magnetic hard drives), de-activate certain sub-systems, or some combination of these.

Similarly, at least one internal barometric pressure sensor 56C1 is located inside the pressurized part 62 of the housing 14 and at least one external barometric pressure sensor 56C2 is located outside the pressurized part 62 of the housing 14 so that both the internal pressure inside the pressurized part 62 of the housing 14 and the ambient pressure can be monitored. Monitoring the pressure that affects the data storage device 10 is important because the pressure affects cooling of the data storage device 10 and also affects proper operation of the main data storage units 16 where the main data storage units 16 are magnetic hard drives. Specifically, in such circumstances the main data storage units 16 will be the primary source of heat during operation of the data storage device 10, and this heat must be extracted to maintain operation of the data storage device 10. Although the housing 14 will transfer some of this heat via conduction, it is convection that provides the main means of transferring heat from the interior of the housing 14 of the data storage device 10 to the ambient environment. Convection requires air flow, and at high altitudes where the atmosphere is thinner, convection is less effective. The signals from the external barometric pressure sensor 56C2 can indicate when the ambient atmosphere is too rarified to sustain heat transfer by convection. The pressurized environment 58 is required because magnetic hard drives operate by floating the read/write head micrometers away from the storage platter on a cushion of air, and in a rarified atmosphere such as that at higher altitudes, the potential for a head crash (destroying data and/or the magnetic hard drive) is significantly increased. Monitoring internal pressure on a continual basis allows the processor 44 to initiate appropriate action (e.g. activating an alarm, spinning-down the drives, or both) if the detected pressure inside the pressurized part 62 of the housing 14 falls below a specified limit. The external barometric pressure sensor(s) 56C2 monitors the outside barometric pressure, which is important for maintaining proper heat transfer, and the processor can initiate appropriate action (e.g. activating an alarm, spinning-down the drives, or both) in response to adverse ambient pressure. In addition, the processor 44 is configured to compare signals from the internal and external barometric pressure sensors 56C1, 56C2 to determine whether a barometric pressure differential threshold has been exceeded, indicating that a leak exists between the pressurized part 62 of the housing 14 and the ambient atmosphere, and to initiate an appropriate action in response, such as activating the alarm system 60, spinning-down the drives, or both. The barometric pressure differential threshold may be based upon the environment in which the data storage device 10 is to be used; for example the barometric pressure differential threshold would be higher in pressurized, high altitude uses since a substantial differential is expected. The processor 44 may also track changes in the barometric pressure differential over time, to identify slow leaks.

In the illustrated embodiment, the accelerometer 56A is a 3-axis accelerometer that can detect both the static orientation of the data storage device 10 and any changes in its motion that may occur during operation. The processor 44 is configured to initiate an appropriate action in response to a signal from the accelerometer 56A that either the orientation or the motion of the data storage device move outside of a specified range, such as when the data storage device 10 is mounted in an aircraft and the aircraft makes a sudden movement. The action initiated by the processor 44 may include, for example, activating the alarm system 60, spinning-down the drives, or both. In addition, depending on the desired mechanical placement of the data storage device 10 and other external system components, the data storage device 10 may be oriented either vertically or horizontally. The accelerometer 56A can measure the gravity vector and send a signal to the processor 44 so that the processor 44 can orient the display 50 for maximum readability given the current orientation of the data storage device 10.

While the accelerometer 56A, temperature sensors 56B1, 56B2 and barometric pressure sensors 56C1, 56C2 are shown as exemplary environmental sensors, their inclusion should not be taken as limiting the types of environmental sensors that can be used according to aspects of the present invention. For example, and without limitation, humidity sensors, altitude sensors, angular velocity sensor (e.g. a gyroscope), GPS locators, magnetic field sensors, digital compasses and sound sensors may also be used.

As noted above, in one embodiment of an aspect of the invention the main data storage units 16 are magnetic hard drives. Magnetic hard drives read and write data by moving a head that floats on a cushion of air, only micrometers thin, between the head and a storage platter. For many applications, including airborne operation, the principal component of vibration is in the vertical direction, relative to the earth's surface. When a magnetic hard drive is oriented horizontally relative to the earth's surface (i.e. the storage platter is generally perpendicular to the gravitational force vector), the potential for vertical vibration to cause the head to impact the storage platter (referred to as a "head crash") is dramatically increased. When the main data storage units 16 are magnetic hard drives, the processor 44 can use the signal from the accelerometer 56A representing the gravity vector to control operation of the main data storage units 16 so that they only operate when the data storage device 10 is oriented such that the main data storage units 16 are vertical relative to the earth's surface (i.e. the storage platter is generally parallel to the gravitational force vector). In this orientation, vertical vibrations will most likely result in no more than the head of one or more of the main data storage units 16 moving unexpectedly, which will not damage that main data storage unit 16 but will merely require that new seek operations be issued.

Additionally, the accelerometer 56A may be used to monitor the vibrational history of the data storage device 10 during operation, which may be useful not only for the data storage device 10, but also other external system components. The integrated processor 44 can continuously log the accelerations experienced to the processor storage 46 for later retrieval, and can also monitor the vibrational history of the data storage device 10 and trigger alarms for specified events.

As noted above, in one embodiment the data storage device 10 includes a backup battery 29 coupled to the power bus 28. In general, from a data integrity perspective, it is better for the external data processing system 12 to which the data storage device 10 is coupled to cleanly shut-down any disk operations and set up the data storage device 10 to display the desired information (e.g. contents of the data storage device) on the display 50 before physically disconnecting the data storage device 10 from the external data processing system 12. However, it is possible that the data storage device 10 may be disconnected from the external data processing system 12 before such procedures are implemented, either accidentally or because of an emergency. When backup power is available, such as from the backup battery 29 or a suitable capacitor, for example, it is possible for the processor 44 to note such a condition, typically exemplified by an unexpected interruption of the power supply to the power bus 26, and take appropriate actions to place the subsystems of the data storage device 10 into a safe, inactive state. These actions will typically include saving the operational parameters of the data storage device 10 at the time of power removal, and updating the display 50 to a default representation of the contents of the data storage device 10, possibly including an indication of the unexpected disconnection. Depending on the type of disk organization used by the data storage device 10, this procedure may provide an acceptable means of disconnecting the data storage device 10 from an external data processing system in time-critical situations. In addition, providing for the processor 44 to execute appropriate actions to place the subsystems of the data storage device 10 into a safe, inactive state is also advantageous in circumstances where there is a system-wide power failure, or a malfunction in the power bus 26. Appropriate current sensors (not shown) may be provided to detect such malfunctions in the power bus 26, with such current sensors being coupled to the processor 44.

Figure 8:
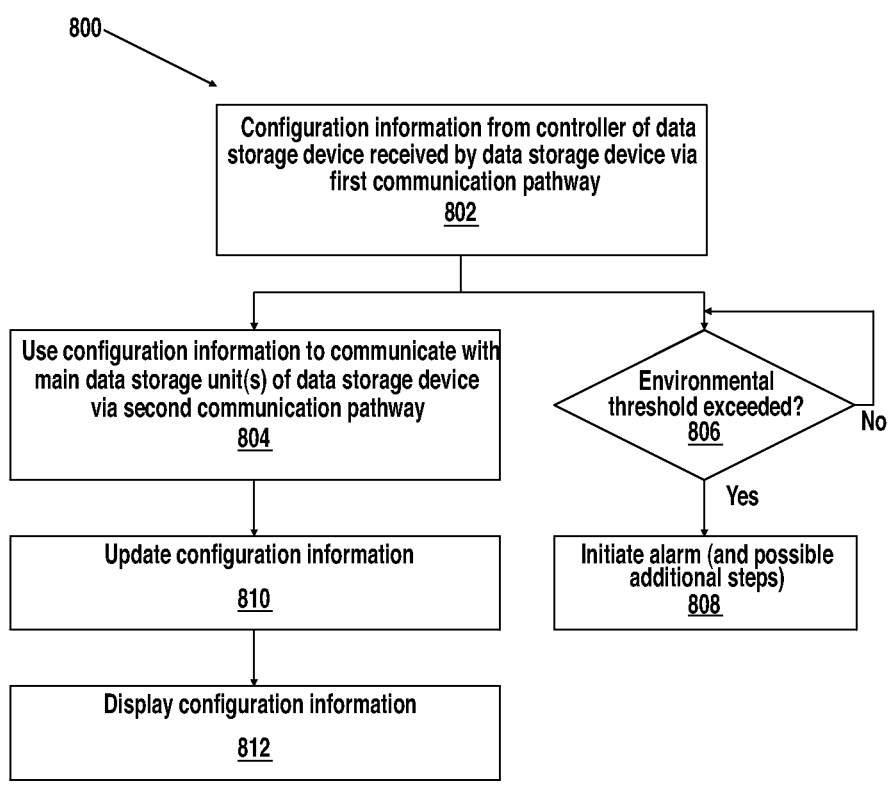
FIG. 8 is a flow chart showing an exemplary method for operating a data bus connection between a data processing system and a data storage device external to the data processing system.

The data storage device 10 thus enables an exemplary method for operating a data bus connection between a data processing system, such as the external data processing system 12, and a data storage device external to the data processing system, such as the data storage device 10. This method is shown in flowchart form in FIG. 8 and indicated generally by the reference numeral 800. At step 802, configuration information from a controller of the data storage device, such as the controller 22, is received by the data processing system via a first communication pathway, such as the controller communication port 24. The configuration information reflects the configuration of a plurality of discrete individual non-volatile main data storage units, such as main data storage units 16, forming part of the data storage device. At step 804, the data processing system uses the configuration information to communicate with at least one of the main data storage units of the data storage device via a second communication pathway, such as the data bus 18 and data communication port 20. As explained above, the first communication pathway is logically isolated from the second communication pathway. At step 806, carried out in parallel with step 804, at least one environmental condition of an environment in which the data storage device is located is monitored, and, at step 808, responsive to an indication that an environmental threshold is exceeded, an alarm is initiated and additional steps may also be taken. Typically, steps 806 and 808 will be carried out by a controller, such as the controller 22, on the data storage device; in alternate embodiments environmental sensor signals may be transmitted to the data processing system for monitoring, such as via the controller communication port 24. The monitoring sensors, such as environmental sensors 56A, 56B1, 56B2, 56C1, 56C2, will typically be carried by the main data storage device, but may alternatively be located elsewhere within the environment being monitored, where appropriate. As explained above, the environmental conditions may include, without limitation, acceleration, temperature, and barometric pressure. At step 810, after the communication between the data processing system and the main data storage units is complete, the data processing system updates the configuration information via the first communication pathway, and at step 812 at least a portion of the configuration information is displayed. The information may be presented on a display of the data processing system, on a display of the data storage device, or both.

Figure 5:
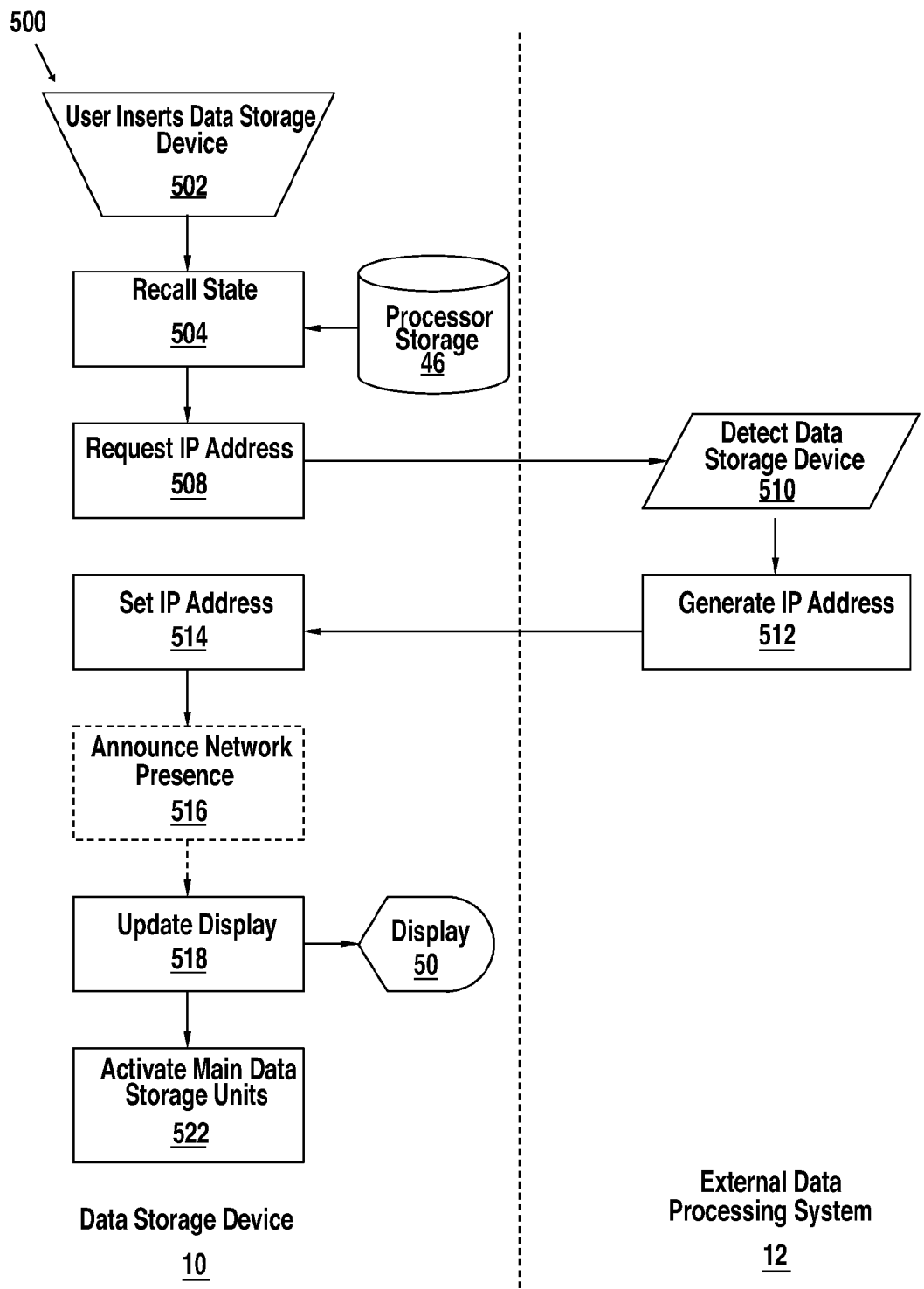
FIG. 5 is a flow chart showing an exemplary method for detection of a data storage device according to an aspect of the present invention by an external data processing system.

FIG. 5 shows an exemplary method 500 for detection of a data storage device, such as the data storage device 10, by an external data processing system, such as the external data processing system 12. The method 500 is directed to cases in which the controller 22 of the data storage device 10 comprises a processor 44 and a processor storage 46.

At step 502, a user physically connects the data storage device 10 to the external data processing system 12. At step 504, the current state of the data storage device 10 is recalled by retrieving the state data from the processor storage 46. At step 508, the data storage device 10 requests an IP address from the external data processing system 12. This request causes the external data processing system 12 to detect the data storage device 10, and the external data processing system 12 then generates an IP address and communicates it to the data storage device 10 at step 512. At step 514, the data storage device 10 sets the IP address communicated at step 512 as its IP address, that is, the IP address for the data storage device 10. At optional step 516, the data storage device 10 announces its presence on the network of which the external data processing system 12 forms a part, and at step 518 the data storage device 10 updates its display 50 to reflect its new status. Then, at step 522, the data storage device 10, by way of instructions from the processor 44, activates the main data storage units 16. For example, when the main data storage units 16 are magnetic disk drives, the data storage device 10 may spin up these disk drives. The steps 504, 508, 514, 516, 518 and 522 are typically implemented by the processor 44, and the steps 510 and 512 will typically be implemented by one or more processors of the external data processing system 12. Within the method 500, all of the communications between the data storage device 10, in particular the processor 44, and the external data processing system 12 are transmitted via the controller communication port 24 and external controller communication port 34.

Figure 6:
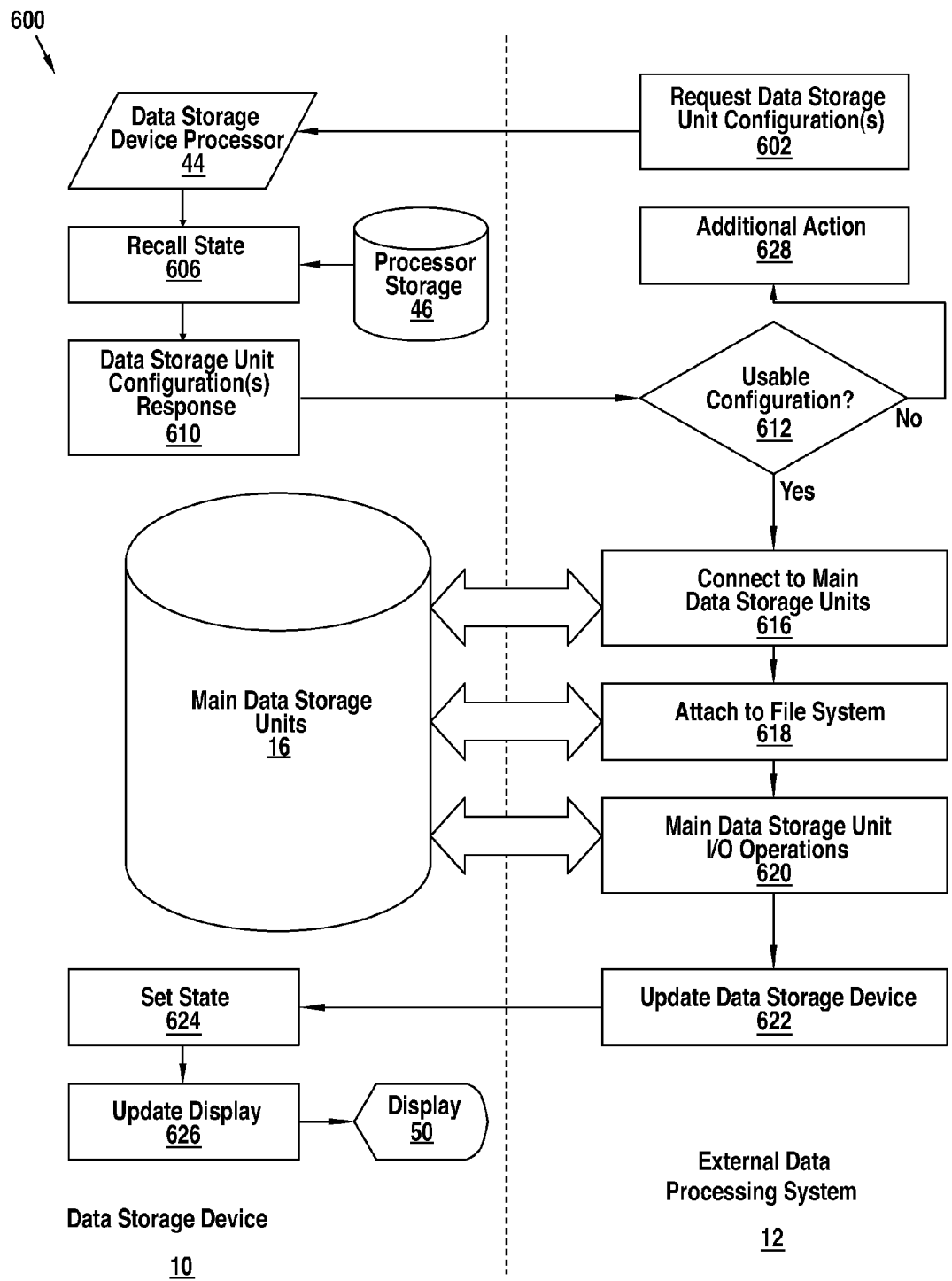
FIG. 6 is a flow chart showing an exemplary method for logically connecting an external data processing system to main data storage units of a data storage device according to an aspect of the present invention.

FIG. 6 shows an exemplary method 600 for logically connecting an external data processing system, such as the external data processing system 12, to the main data storage units, such as main data storage units 16, of a data storage device, such as the data storage device 10. The method 600 is directed to cases in which the controller 22 of the data storage device 10 comprises a processor 44 and a processor storage 46.

At step 602, the external data processing system 12 requests configuration information about the configuration of the main data storage units 16 from data storage device 10, in particular from the processor 44. At step 606, the processor 44 recalls the current state of the data storage device 10, which includes the configuration information about the configuration of the main data storage units 16, by retrieving it from the processor storage 46. The processor 44 then communicates the configuration information about the configuration of the main data storage units 16 to the external data processing system 12 at step 610. At step 612, the external data processing system 12 checks whether the configuration of the main data storage units 16 is usable by the external data processing system 12. Responsive to a "yes" determination at step 612, the external data processing system 12 then connects to the main data storage units 16 at step 616, attaches the main data storage units 16 to the file system of the external data processing system 12 at step 618, and then carries out the desired I/O operations with the main data storage units 16 at step 620. Following the I/O operations at step 620, at step 622 the external data processing system 12 communicates an update on the state of the main data storage units 16 to the processor 44 of the data storage device 10, which then sets the state of the data storage device 10 at step 624, and then at step 626 updates the display 50. The external data processing system 12 may communicate updates (step 622) to the processor 44 at preset time intervals, or periodically after a certain number of I/O operations or after a certain volume of data has been transferred. Responsive to a "no" determination at step 612, the external data processing system 12 takes additional action 628, such as communicating the incompatibility to the processor 44.

The communications between the processor 44 and the external data processing system 12 at steps 602, 610 and 622 are transmitted via the controller communication port 24 and external controller communication port 34, whereas the communications between the external data processing system 12 and the main data storage units 16 at steps 616, 618 and 620 are transmitted via the external data communication port 30, the data communication port 20 and the data bus 18.

Figure 7:
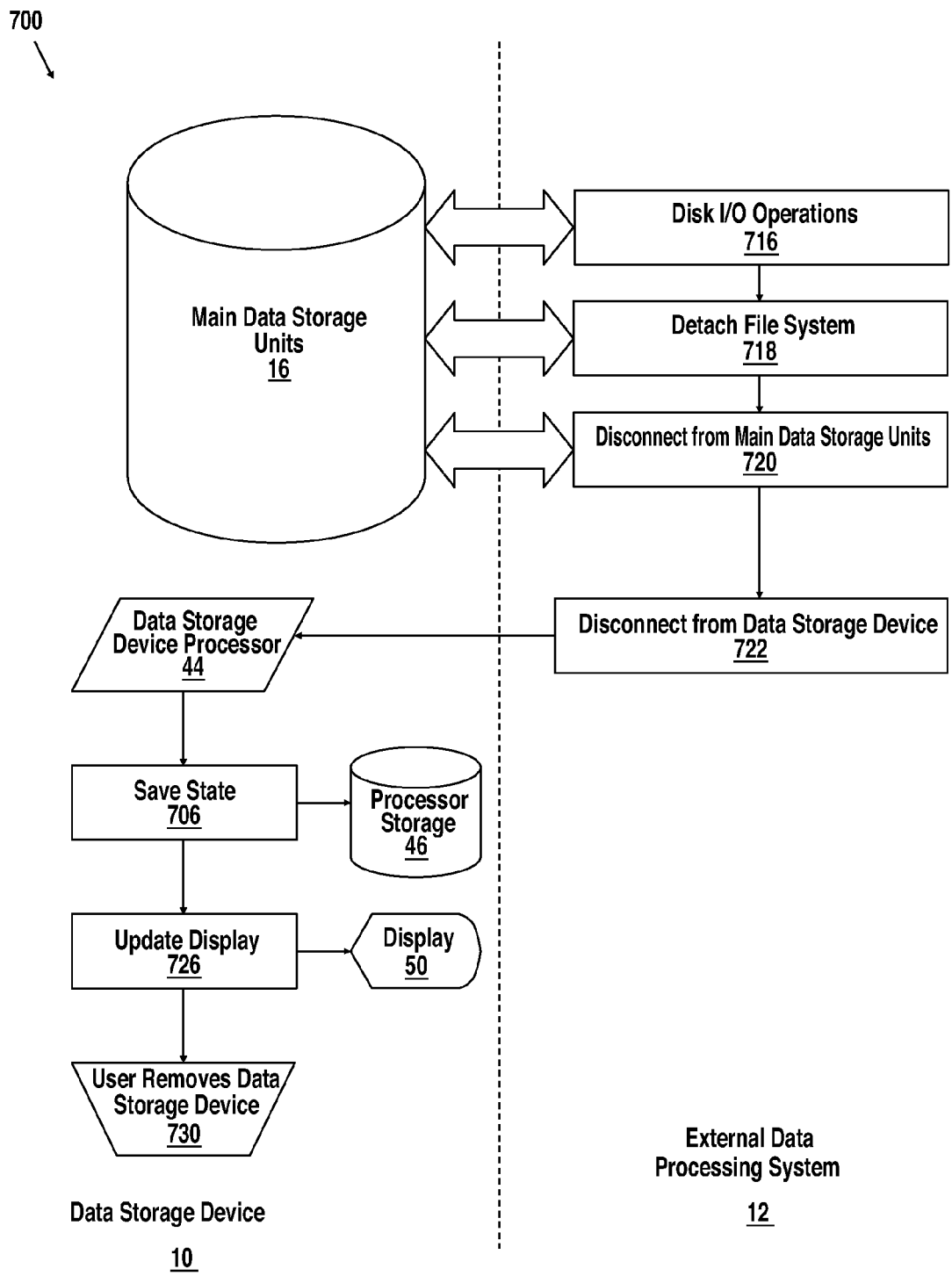
FIG. 7 is a flow chart showing an exemplary method for logically disconnecting an external data processing system from main data storage units of a data storage device according to an aspect of the present invention.

FIG. 7 shows an exemplary method 700 for logically disconnecting an external data processing system, such as the external data processing system 12, from the main data storage units, such as main data storage units 16, of a data storage device, such as the data storage device 10. The method 700 is directed to cases in which the controller 22 of the data storage device 10 comprises a processor 44 and a processor storage 46.

At step 716, the external data processing system 12 executes any final I/O operations, and at step 718 the external data processing system 12 detaches its file system from the main data storage units 16. Consequent to this detaching step 718, and shown for ease of illustration as separate step 720, the external data processing system 12 logically disconnects from the main data storage units 16. Once the external data processing system 12 has disconnected from the main data storage units 16 (step 720), at step 722 the external data processing system 12 communicates to the processor 44 on the data storage device 10 that the external data storage device has logically disconnected itself. The processor 44 then, at step 706, saves the current state of the data storage device 10, including updated configuration information about the configuration of the main data storage units 16, to the processor storage 46. At step 726, the processor 44 updates the display 50 to reflect the changes made during the just-completed session with the external data processing system 12, and then at step 730 the user can physically disconnect the data storage device 10 from the external data processing system 12.

The communications between the external data processing system 12 and the main data storage units 16 at steps 716, 718 and 720 are transmitted via the external data communication port 30, the data communication port 20 and the data bus 18, whereas the communication from the external data processing system 12 to the processor 44 at step 722 is transmitted via the controller communication port 24 and external controller communication port 34.

Figure 1:
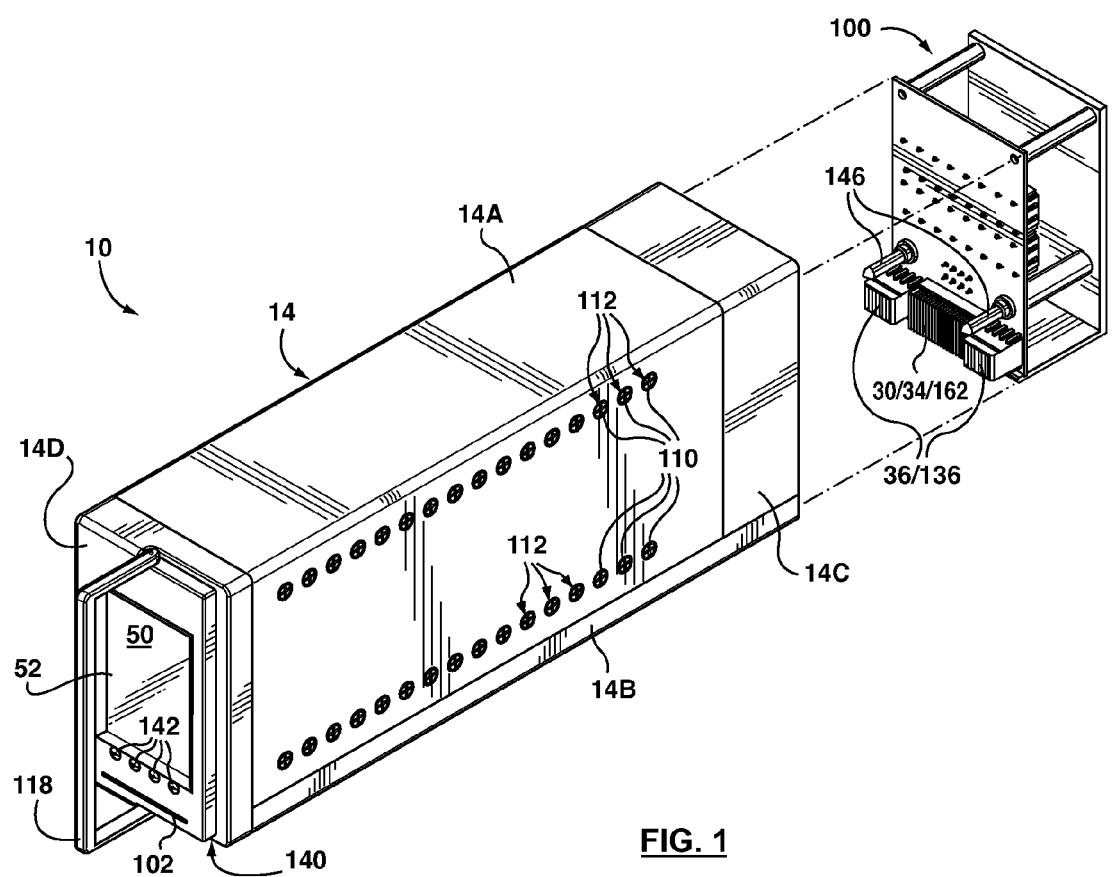
FIG. 1 is a perspective view showing an exemplary physical embodiment of a data storage device according to an aspect of the present invention, aligned with a corresponding exemplary receptacle for an external data processing system.
Figure 2:
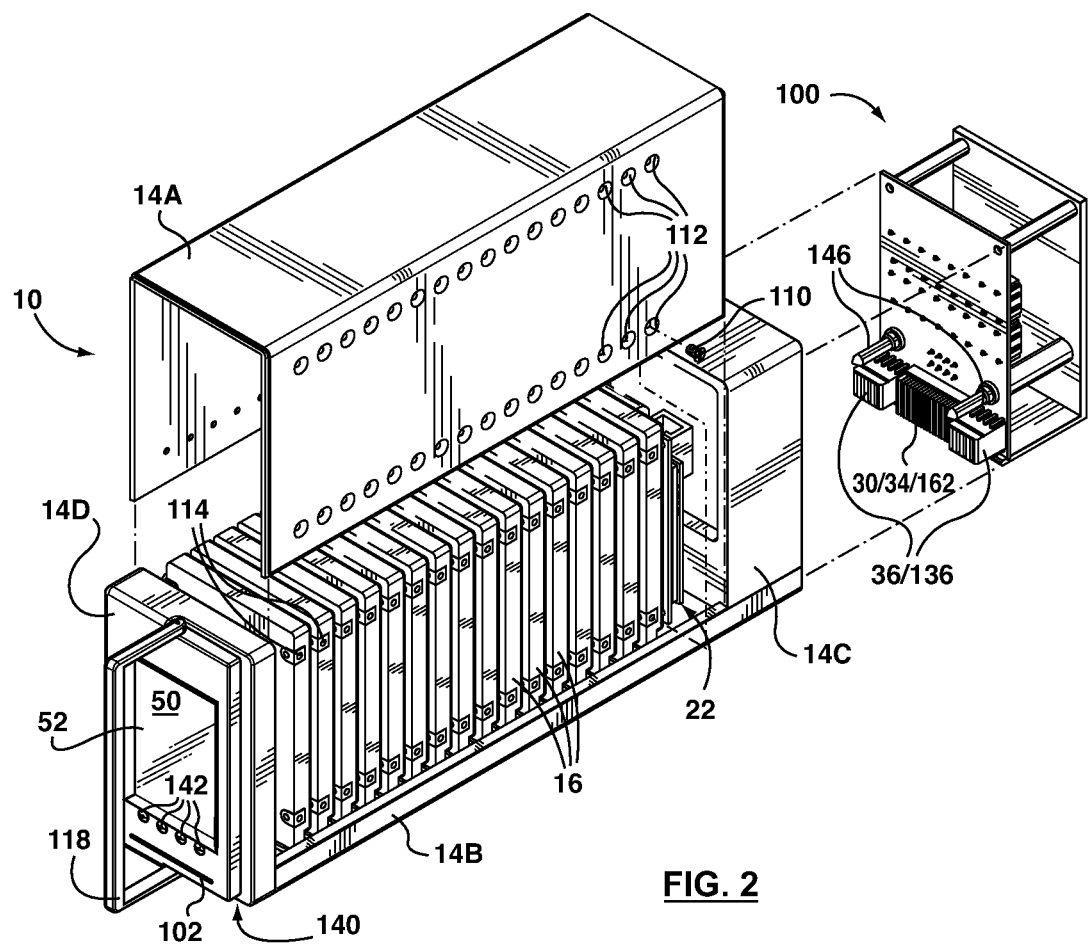
FIG. 2 is a perspective view showing the data storage device of FIG. 1 with an upper portion of its housing removed, aligned with the receptacle of FIG. 1.
Figure 3:
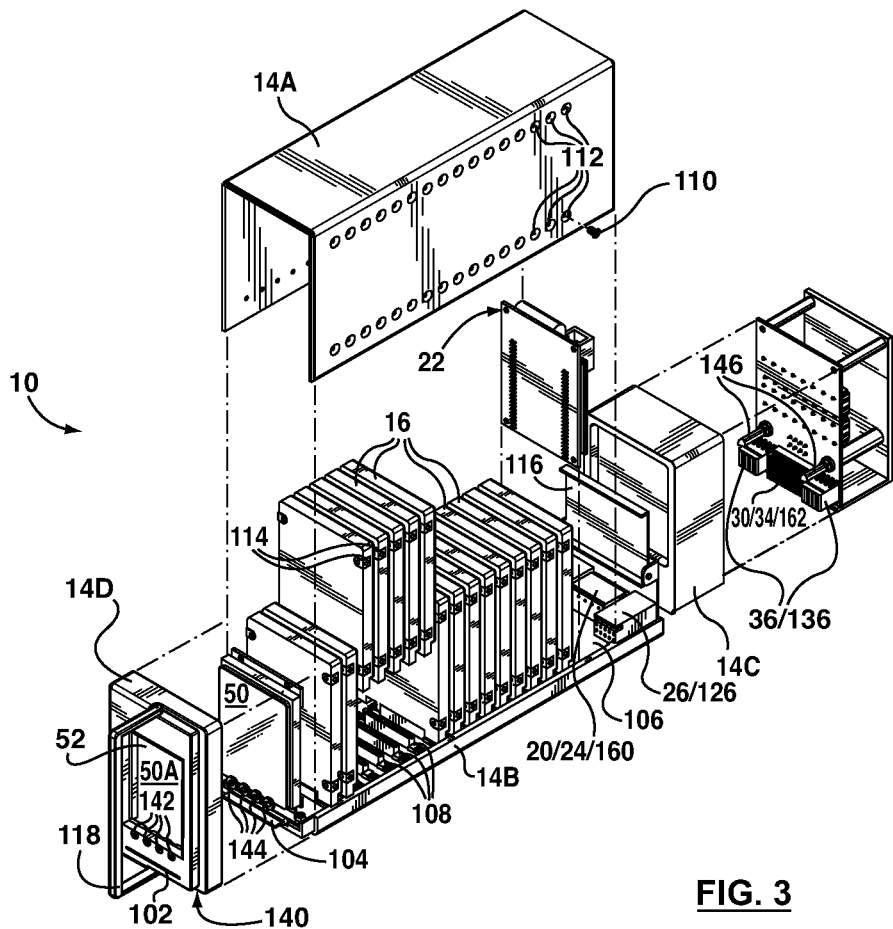
FIG. 3 is an exploded perspective view of the data storage device of FIG. 1, aligned with the receptacle of FIG. 1.

FIGS. 1 to 3 show an exemplary physical embodiment of a data storage device 10 according to an aspect of the present invention, aligned with a corresponding receptacle 100 for an external data processing system, such as the external data processing system 12 (not shown in FIGS. 1 to 3). This particular embodiment of a data storage device 10 has dimensions of approximately 4.5 inches by 3.0 inches by 11.0 inches, and uses 2.5 inch magnetic hard drives, up to 12 mm thickness, as the main data storage units 16. This is merely one exemplary physical embodiment of an aspect of the invention, and other physical embodiments are also possible. For example, and without limitation, 3.5 inch magnetic hard drives could be used, with the other dimensions being modified accordingly. Where elements were illustrated schematically in FIG. 4, the same reference numerals are used to refer to the same elements shown in FIGS. 1 to 3. The environmental sensors 56A, 56B1, 56B2, 56C1 and 56C2 are not shown in FIGS. 1 to 3; their placement and logical and electrical connection is within the capability of one skilled in the art, now informed by the herein disclosure.

The data storage device 10 comprises a housing 14 formed from a top housing portion 14A, a bottom housing portion 14B, a rear housing 14C and a front panel 14D which are secured together to form the complete housing 14 and which can be hermetically sealed. In alternative embodiments (not shown), the housing may comprise only two pieces, three pieces, or more than four pieces. For example, the housing may comprise an extruded tube with end caps (not shown).

As shown in FIG. 3, the bottom housing 14B supports a printed circuit board 106 which carries a plurality of mounting receptacles 108 for the main data storage units 16 (magnetic hard drives in the embodiment shown in FIGS. 1 to 3). The main data storage units 16 are further secured to the housing 14 by way of screws 110 passing through corresponding apertures 112 in the upper housing 14A to be received in corresponding threaded bores 114 in the casings of the main data storage units 16. Screws, of course, are merely one exemplary type of fastener, and other fasteners or combinations of fasteners, with or without shock absorption and heat extraction components, may also be used. One or more LEDs 104 (FIG. 3), representing the status of the main data storage units 16, are mounted forwardly on the printed circuit board 106, at the end thereof adjacent the front panel 14D when assembled. The LEDs 104 can indicate, by color, flashing sequence, or the like, whether power is supplied to the main data storage units 16, whether the main data storage units 16 are active, whether any of the main data storage units has experienced an error, or the like.

The printed circuit board 106 also carries a mounting receptacle (not shown) for the controller 22, and also carries the data bus 18 and power bus 28 (not specifically shown in FIGS. 1 to 3), as well as the data communication port 20, controller communication port 24 and power port 26. In the illustrated embodiment, the data communication port 20 and controller communication port 24 are physically, although not logically, integrated into a single external communication connector 160 (FIG. 3). More particularly, although the data communication port 20 and controller communication port 24 are physically part of the same external communication connector 160, each has its own dedicated set of pins connected, respectively, to the data bus 18 only and the controller 22 only. These pins are electrically insulated from one another. Hence the data communication port 20 and controller communication port 24 remain logically isolated from one another. Similarly, the corresponding external data communication port 30 and external controller communication port 34 are physically, but not logically, integrated into a single storage connector 162, which, along with the external power port 36 of the external data processing system (not shown) forms part of the receptacle 100, as shown. The power port 26 on the data storage device 10 comprises two physical power connectors 126, and the external power port 36 of the external data processing system similarly comprises two corresponding physical power connectors 136. A cover 116 for the data communication port 20, controller communication port 24 and power port 26 is hingedly secured to the rear housing 14C. The two physical power connectors 136 on the receptacle 100 are coupled to the power supply of the external data processing system, the portion of the storage connector 162 comprising the external data communication port 30 is coupled to the storage I/O system, for example the SATA connectors, of the external data processing system, and the portion of the storage connector 162 comprising the external controller communication port 34 is connected to communications network hardware forming part of the external data processing system 12, for example an Ethernet switch. In other embodiments, the portion of the storage connector 162 comprising the external controller communication port 34 may connect directly to a processor, or processor subsystems, of the external data processing system without network mediation.

The front panel 14D has a display window 50A (FIG. 3) which provides access to the display 50 and can hermetically seal with the display 50, for example by way of a resilient gasket. The front panel 14D also includes a status window 102 which provides visibility to the one or more LEDs 104 mounted forwardly on the printed circuit board 106 to indicate the status of the main data storage units 16. Buttons 142 on the front panel 14D cooperate with buttons 144 coupled to the printed circuit board 106 to provide controls for the data storage device, either alternatively to or in addition to the display 50 having a touch screen display surface 52. A handle 118 is pivotally mounted to the front panel 14D to facilitate straightforward insertion, removal, and transport of the data storage device. The handle 118 folds away into a recess 140 in the front panel 14D when the data storage device 10 is received by the receptacle 100 on the external data processing system, and can optionally actuate a locking mechanism to inhibit accidental disengagement of the data storage device 10 from the receptacle 100. A software-controlled or firmware-controlled locking mechanism may also be provided, although some mechanical means of unlocking the cartridge must still be provided for unpowered situations. In other embodiments, the handle may be rigidly mounted to the housing, or may be omitted entirely.

To physically mount the data storage device 10 on the receptacle 100, the data storage device 10 is positioned so that the outer walls of the rear housing 14C are in registration with the outer perimeter of the receptacle 100, with the external communication connector 160 and power connectors 126 in registration with the corresponding storage connector 162 and external power connectors 136. In addition, when so aligned, support pins 146 will be in registration with corresponding bores (not shown) in the rear housing 14C. The data storage device 10 can then be physically mounted on the receptacle 100 by sliding it into position.

A currently preferred embodiment has been described by way of example. It will be apparent to persons skilled in the art that a number of variations and modifications can be made without departing from the scope of the invention as defined in the claims.

The invention claimed is:

1. A data storage device for use in cooperation with a data processing system external to the data storage device, the data storage device comprising:
   a housing;
   a plurality of discrete individual non-volatile main data storage units carried by the housing;
   a data bus carried by the housing and coupled to each of the main data storage units to transmit data to and receive data from the main data storage units;
   a power bus carried by the housing and coupled to each of the main data storage units;
   the power bus having, for each main data storage unit, at least one switch associated with the main data storage unit and operable to selectively permit or interrupt current flow to the main data storage unit;
   a controller carried by the housing and coupled to the power bus to receive power therefrom and operable to selectively open and close the switches;
   the controller being isolated from the data bus and isolated from the main data storage units;
   a data communication port carried by the housing and coupled to the data bus to enable external communication to and from the main data storage units;
   a controller communication port carried by the housing and coupled to the controller to enable external communication to and from the controller;
   the data communication port and the controller communication port being distinct from and isolated from one another; and
   a power port carried by the housing and coupled to the power bus for connection to an external power source.

2. The data storage device of claim 1, wherein:
   the controller comprises at least one processor;
   the at least one processor communicates with a processor storage carried by the housing and distinct from the main data storage units.

3. The data storage device of claim 2, further comprising:
   a display carried by the housing;
   the display having a display surface visible from outside the housing;
   the display being coupled to the power bus;
   the display being coupled to the at least one processor to display information in accordance with instructions from the at least one processor.

4. The data storage device of claim 3, wherein the display is a persistent display that continues to display its most recent image after discontinuance of electrical power supply to the display.

5. The data storage device of claim 2, further comprising:
   at least one environmental sensor carried by the housing and coupled to the power bus and to the at least one processor;

the at least one processor configured to initiate an action in response to signaling from the at least one environmental sensor indicating that an environmental threshold is exceeded.

6. The data storage device of claim 5, wherein the at least one environmental sensor comprises at least one sensor selected from the group consisting of:

accelerometer, temperature sensor, barometric pressure sensor.

7. The data storage device of claim 6 wherein:

the main data storage units, the controller, the processor storage, the data bus and the power bus are contained within a pressurized environment in a pressurized part of the housing;

the at least one environmental sensor comprises at least one internal temperature sensor located inside the pressurized part of the housing and at least one external temperature sensor located outside the pressurized part of the housing; and the at least one processor is configured to compare signals from the internal and external temperature sensors to determine whether a temperature differential threshold has been exceeded and, responsive to a determination that the temperature differential threshold has been exceeded, to initiate an action.

8. The data storage device of claim 6, wherein:

the main data storage units, the controller, the processor storage, the data bus and the power bus are contained within a pressurized environment in a pressurized part of the housing;

the at least one environmental sensor comprises at least one internal barometric pressure sensor located inside the pressurized part of the housing and at least one external barometric pressure sensor located outside the pressurized part of the housing; and the at least one processor is configured to compare signals from the internal and external barometric pressure sensors to determine whether a barometric pressure differential threshold has been exceeded and, responsive to a determination that the barometric pressure differential threshold has been exceeded, to initiate an action.

9. The device of claim 1, wherein the housing comprises a handle.

10. A data storage device, comprising:

a housing;

a plurality of discrete individual non-volatile main data storage units carried by the housing;

a data bus carried by the housing and coupled to each of the main data storage units to transmit data to and receive data from the main data storage units;

a power bus carried by the housing and coupled to each of the main data storage units;

a data communication port carried by the housing and coupled to the data bus to enable external communication to and from the main data storage units;

a configuration storage element carried by the housing and coupled to the power bus to receive power therefrom;

the configuration storage element distinct from and isolated from the main data storage units, the configuration storage element containing configuration information reflecting a configuration of the main data storage elements;

a configuration communication port carried by the housing and coupled to the configuration storage element to enable external communication to and from the configuration storage element;

the data communication port and the configuration communication port being distinct from and isolated from one another; and a power port carried by the housing and coupled to the power bus for connection to an external power source.

11. The data storage device of claim 10, wherein the configuration storage element is coupled to the configuration communication port via a processor coupled to the configuration storage element and to the configuration communication port.

12. The data storage device of claim 11, wherein the configuration storage element contains state information about at least one state of the main data storage units.

13. The data storage device of claim 12, wherein the state information comprises information about data stored on the main data storage units.

14. The data storage device of claim 12, further comprising at least one environmental sensor carried by the housing and coupled to the power bus and to the configuration storage element, wherein the state information comprises information derived from input from the at least one environmental sensor.

15. A method for operating a data bus connection between a data processing system and a data storage device external to the data processing system, the method comprising:

receiving, at the data processing system, configuration information from a controller of the data storage device via a first communication pathway;

the configuration information reflecting a configuration of a plurality of discrete individual non-volatile main data storage units forming part of the data storage device; and the data processing system using the configuration information to communicate with at least one of the main data storage units of the data storage device via a second communication pathway;

wherein the first communication pathway and the second communication pathway are isolated from one another.

16. The method of claim 15, further comprising:

monitoring at least one environmental condition of an environment in which the data storage device is located; and initiating an action when an environmental threshold is exceeded.

17. The method of claim 16, wherein the at least one environmental condition comprises at least one environmental condition selected from the group consisting of: acceleration, temperature, and barometric pressure.

18. The method of claim 15, further comprising displaying at least a portion of the configuration information.

* * * * *